(12) United States Patent
Inai et al.

(10) Patent No.: US 11,664,675 B2
(45) Date of Patent: May 30, 2023

(54) ELECTRONIC DEVICE AND CONTROL METHOD

(71) Applicant: CANON KABUSHIKI KAISHA, Tokyo (JP)

(72) Inventors: Kento Inai, Kanagawa (JP); Tsuyoshi Fujisaki, Tokyo (JP); Takuma Iwagami, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/484,091

(22) Filed: Sep. 24, 2021

(65) Prior Publication Data
US 2022/0103006 A1 Mar. 31, 2022

(30) Foreign Application Priority Data

Sep. 28, 2020 (JP) .............................. JP2020-162624

(51) Int. Cl.
| | |
|---|---|
| H02J 9/06 | (2006.01) |
| G05F 1/625 | (2006.01) |
| H02J 7/00 | (2006.01) |
| H02J 1/08 | (2006.01) |
| G06F 1/26 | (2006.01) |
| G06F 3/14 | (2006.01) |
| H04N 23/65 | (2023.01) |

(52) U.S. Cl.
CPC ................ *H02J 9/06* (2013.01); *G05F 1/625* (2013.01); *G06F 1/263* (2013.01); *H02J 1/082* (2020.01); *H02J 7/0068* (2013.01); *G06F 3/14* (2013.01); *H02J 2207/40* (2020.01); *H04N 23/651* (2023.01)

(58) Field of Classification Search
CPC .. H02J 7/0068; H02J 7/00; H02J 1/082; H02J 1/084; H02J 1/102; H02J 2207/40; G06F 1/26; G06F 1/263; H04N 5/23241; G03B 2217/007
See application file for complete search history.

(56) References Cited

U.S. PATENT DOCUMENTS

| | | | |
|---|---|---|---|
| 2003/0090236 A1* | 5/2003 | Odaohhara | H02J 7/34 320/134 |
| 2009/0150698 A1* | 6/2009 | Lee | G06F 1/3215 713/323 |
| 2018/0115157 A1* | 4/2018 | Chan | H02J 7/342 |

(Continued)

FOREIGN PATENT DOCUMENTS

JP 2004-134145 A 4/2004

*Primary Examiner* — Ryan Johnson
(74) *Attorney, Agent, or Firm* — Cowan, Liebowitz & Latman, P.C.

(57) ABSTRACT

An electronic device includes a first voltage conversion unit, a second voltage conversion unit, and a control unit. The first voltage conversion unit generates a first voltage from power supplied from a first power supply or a second power supply. The second voltage conversion unit generates a second voltage, which is lower than the first voltage, from power supplied from the first power supply or the second power supply. The control unit controls a process of supplying power, supplied from the first power supply, to the first voltage conversion unit and a process of supplying power, supplied from the second power supply, to the second voltage conversion unit, in a case where a predetermined condition is satisfied.

17 Claims, 12 Drawing Sheets

(56) References Cited

U.S. PATENT DOCUMENTS

2020/0084378 A1\* 3/2020 Kawamoto ........ H04N 5/23241
2020/0106291 A1 4/2020 Inai
2020/0366113 A1 11/2020 Inai \* cited by examiner

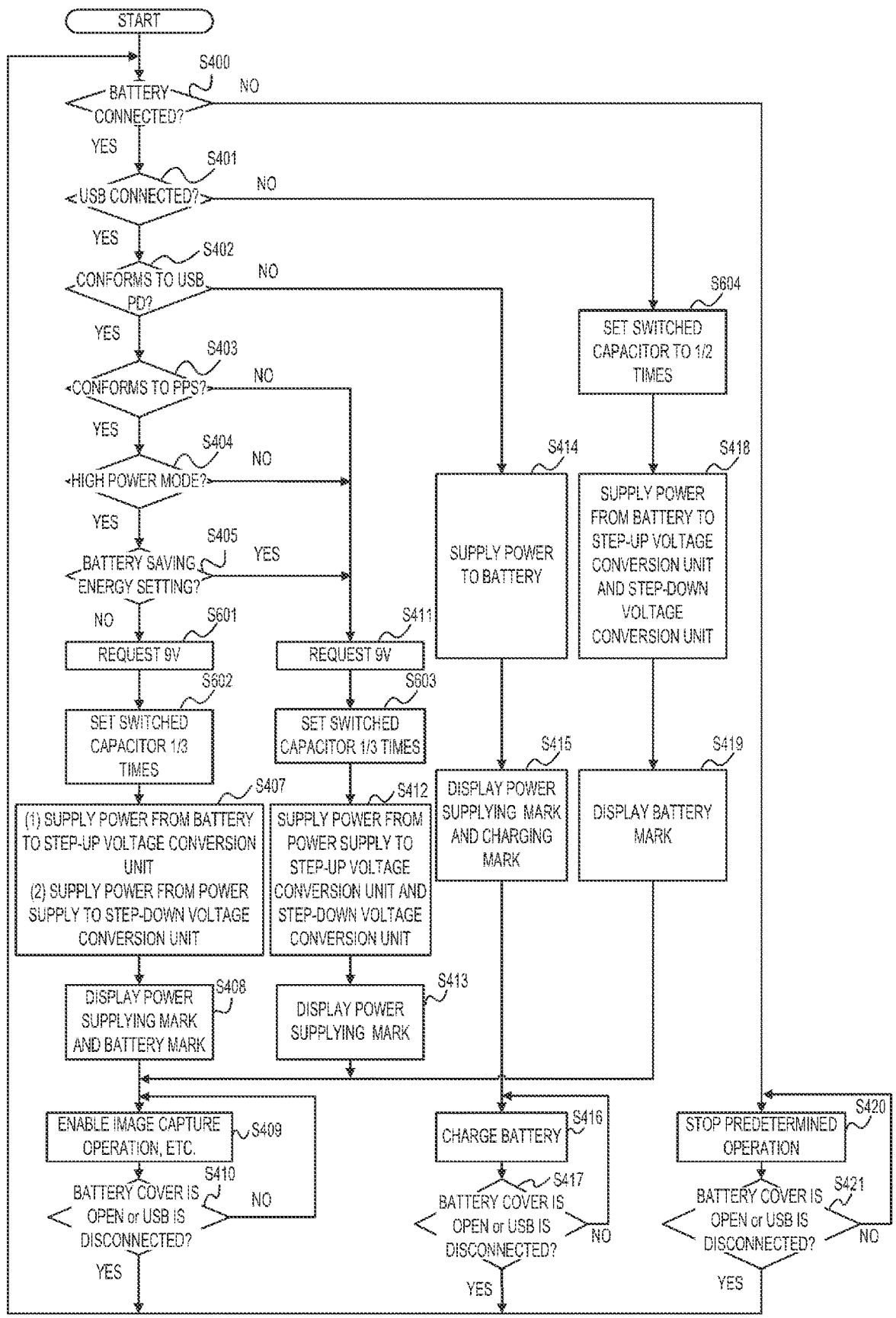

ELECTRONIC DEVICE AND CONTROL METHOD

BACKGROUND

Field of the Disclosure

Aspects of the disclosure generally relate to an electronic device that generates different voltages, and a method of controlling the electronic device.

Description of the Related Art

Japanese Patent Laid-Open No. 2004-134145 discloses an electronic device that generates two different voltages from power supplied from one power supply.

In the electronic device according to Japanese Patent Laid-Open No. 2004-134145, two different voltages are generated from power supplied from one power supply. Therefore, if the voltage difference between low voltage power and high voltage power is large, the power conversion efficiency (ratio of output power to input power) may drop. If the power conversion efficiency drops, power consumption increases and countermeasures against heat are required.

SUMMARY

According to various embodiments, there is provided an electronic device that generates two different voltages and can improve power conversion efficiency.

According to various embodiments, there is provided an electronic device that includes a first voltage conversion unit that generates a first voltage from power supplied from a first power supply or a second power supply; a second voltage conversion unit that generates a second voltage, which is lower than the first voltage, from power supplied from the first power supply or the second power supply; and a control unit that controls a process of supplying power, supplied from the first power supply, to the first voltage conversion unit and a process of supplying power, supplied from the second power supply, to the second voltage conversion unit, in a case where a predetermined condition is satisfied.

According to various embodiments, there is provided a method that includes causing a first voltage conversion unit to generate a first voltage from power supplied from a first power supply or a second power supply; causing a second voltage conversion unit to generate a second voltage, which is lower than the first voltage, from power supplied from the first power supply or the second power supply; and controlling a process of supplying power, supplied from the first power supply, to the first voltage conversion unit and a process of supplying power, supplied from the second power supply, to the second voltage conversion unit, in a case where a predetermined condition is satisfied.

Further aspects of the disclosure will become apparent from the following description of exemplary embodiments.

BRIEF DESCRIPTION OF THE DRAWINGS

FIG. 8 is a flow chart illustrating a power control process according to the second embodiment.

DESCRIPTION OF THE EMBODIMENTS

Figure 1A:
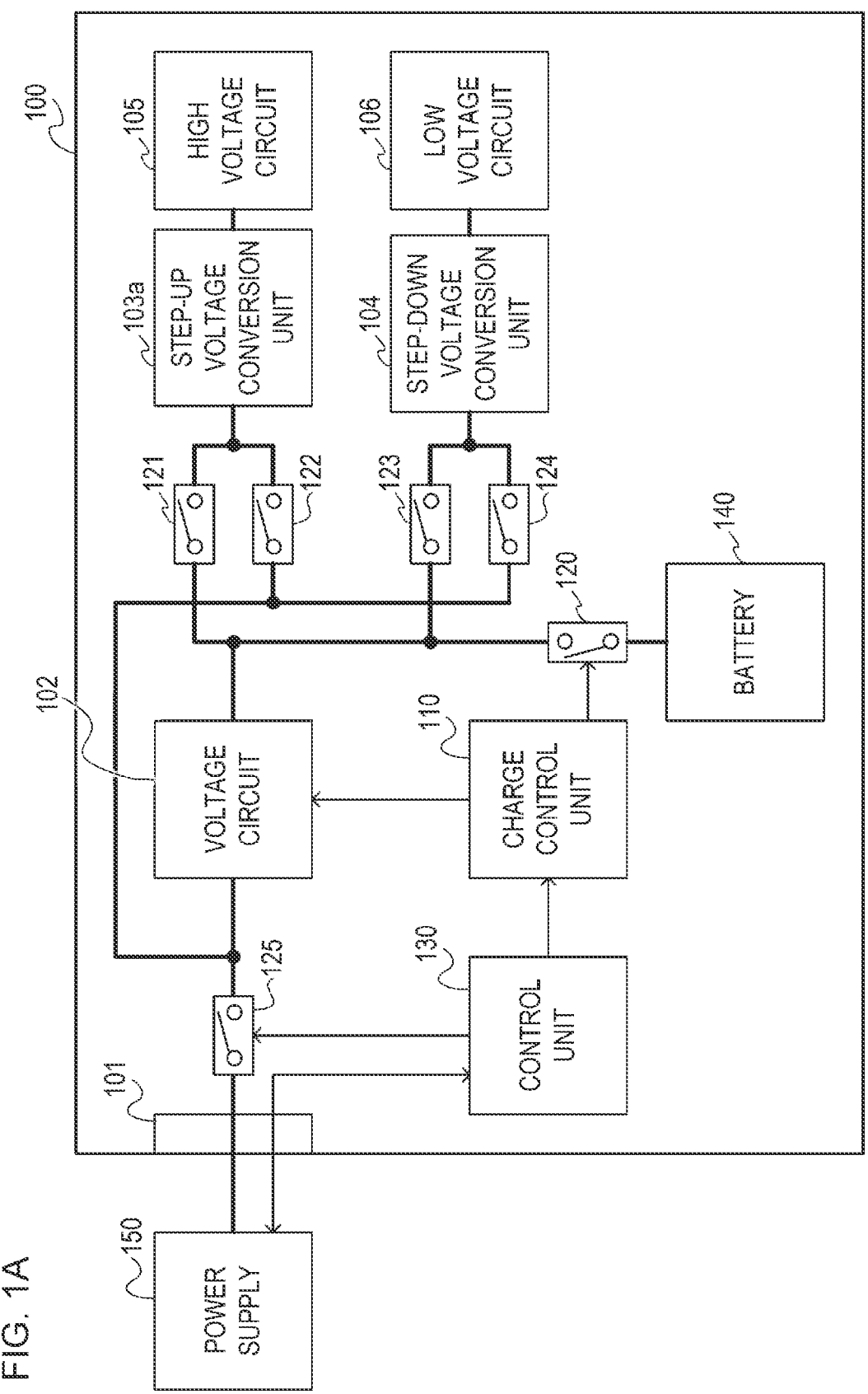
FIG. 1A and FIG. 1B are diagrams illustrating components of an electronic device 100 according a first embodiment.

Exemplary embodiments, features, and aspects of the disclosure will be described below with reference to the drawings. However, aspects of the disclosure are not limited to the following embodiments.

[First Embodiment] An electronic device 100 according to a first embodiment will be described. The electronic device 100 is connectable to a battery 140 which supplies high voltage power, and to a power supply 150 which supplies low voltage power. In a predetermined case, the electronic device 100 supplies power from the battery 140 to a step-up voltage conversion unit 103a which generates high voltage power, and supplies power from the power supply 150 to a step-down voltage conversion unit 104 which generates low voltage power. Thereby the difference between input voltage and output voltage can be decreased in the step-up voltage conversion unit 103a and the step-down voltage conversion unit 104, and as a result, the power conversion efficiency (ratio of the output power to the input power) can be improved.

Composing elements of the electronic device 100 according to the first embodiment will be described next with reference to FIG. 1A. The electronic device 100 can operate as an imaging apparatus (e.g. digital camera). The electronic device 100 may be operable as a PC, a smartphone or a tablet terminal. The electronic device 100 includes a connector 101, a voltage circuit 102, the step-up voltage conversion unit 103a, the step-down voltage conversion unit 104, a high voltage circuit 105, a low voltage circuit 106, a charge control unit 110, a control unit 130, the battery 140 and power switches 120 to 125. The electronic device 100 is connected to the power supply 150 via a cable, so as to acquire power from the power supply 150.

The connector 101 is a universal serial bus (USB) connector to connect to the power supply 150, which is an external device. The electronic device 100 can receive power supplied from the power supply 150 via the connector 101. When power is supplied from the power supply 150 to the electronic device 100, the battery 140 can be charged and the entire electronic device 100 can operate. In the following, operating the entire electronic device 100 by the power supplied from the power supply 150 is referred to as a "power supplying operation".

The voltage circuit 102 is a power supply circuit that changes voltage of the power supplied from the power supply 150. The voltage circuit 102 includes a switching regulating power supply circuit, for example. The power supplied to the voltage circuit 102 is used to charge the battery 140.

The step-up voltage conversion unit 103a is a power supply circuit (voltage conversion unit) that increases the voltage of the supplied power, so as to generate the power to be outputted to the high voltage circuit 105. The step-up voltage conversion unit 103a includes a switching regulating power supply circuit, for example. When the power switches 120 and 121 are turned ON, the power supplied from the battery 140 is supplied to the step-up voltage conversion unit 103a. When the power switches 122 and 125 are turned ON, the power supplied from the power supply 150 is supplied to the step-up voltage conversion unit 103a. The step-up voltage conversion unit 103a has output terminals to output power with various voltages, and can output power of an optimum voltage to the high voltage circuit 105.

The step-down voltage conversion unit 104 is a power supply circuit (voltage conversion unit) that decreases the voltage of the supplied power, so as to generate the power to be outputted to the low voltage circuit 106. The step-down voltage conversion unit 104 outputs power of which voltage is lower than the voltage of power outputted by the step-up voltage conversion unit 103a. The step-down voltage conversion unit 104 includes a switching regulating power supply circuit. When the power switches 120 and 123 are turned ON, the power supplied from the battery 140 is supplied to the step-down voltage conversion unit 104. When the power switches 124 and 125 are turned ON, the power supplied from the power supply 150 is supplied to the step-down voltage conversion unit 104. The step-down voltage conversion unit 104 has of output terminals to output power of various voltages, and can output power of an optimum voltage to the low voltage circuit 106.

The high voltage circuit 105 is a load circuit that requires power of a voltage equivalent to the voltage of the battery 140, or power of a voltage higher than the voltage of the battery 140. The high voltage circuit 105 is a motor circuit to drive the shutter of the electronic device 100, a motor circuit to drive the lens, or a backlight of an LCD 160 (see FIG. 2B), for example.

The low voltage circuit 106 is a load circuit that requires power of a voltage lower than the voltage of the battery 140. The low voltage circuit 106 is an imaging sensor (not illustrated) of the electronic device 100, or a control unit (not illustrated) that performs the imaging process, for example.

The charge control unit 110 detects the voltage of the battery 140 (battery voltage), and controls the voltage circuit 102 and the power switch 120 in accordance with the detected voltage. Thereby a constant current charge or a constant voltage charge for the battery 140 is implemented.

The control unit 130 can control each composing element of the electronic device 100 by executing the programs stored in the memory. The control unit 130 communicates with the power supply 150 and changes the supply voltage from the power supply 150. The control unit 130 switches the power switches 120 to 125 ON/OFF by controlling the charge control unit 110 or by itself.

The battery 140 is a dischargeable and rechargeable power supply. The battery 140 is a battery that the user can remove from the electronic device 100. The battery 140 is a lithium ion battery which includes two battery cells, for example. The voltage range of power of the battery 140 is 6.0V to 8.4V, for example.

The power switches 120 to 125 include a field effect transistor (FET) or the like, respectively.

The power switch 120 is a power switch to electrically connect the battery 140 to other composing elements. The power switches 121 to 124 are power switches to supply the power from the battery 140 and the power supply 150 to the step-up voltage conversion unit 103a or the step-down voltage conversion unit 104.

The electronic device 100 supplies the power from the power supply 150 to each composing element via the power switch 125. When an abnormal state, such as overcurrent or overvoltage, is detected, the control unit 130 turns the power switch 125 OFF. When the power switch 125 is turned OFF, the supply of power from the power supply 150 to each composing element of the electronic device 100 stops, whereby each composing element (each circuit) of the electronic device 100 can be protected.

The power supply 150 supplies power to the electronic device 100. It is preferable that the power supply 150 is a device conforming to the USB power delivery (PD) standard. It is even more preferable that the power supply 150 is a device conforming to the programmable power supply (PPS) of the USB PD standard. The power supply 150 can change the voltage (power supply) of power supplied to the electronic device 100 by a narrow voltage width in accordance with the control by the control unit 130, if the power supply 150 conforms to the programmable power supply (PPS) of the USB PD standard.

In the first embodiment, the power supply 150 is assumed to be a USB power supply to simplify description. However, the power supply 150 may be any device if the device can supply power (for example, a mobile battery, personal computer (PC), or the like).

Figure 1B:
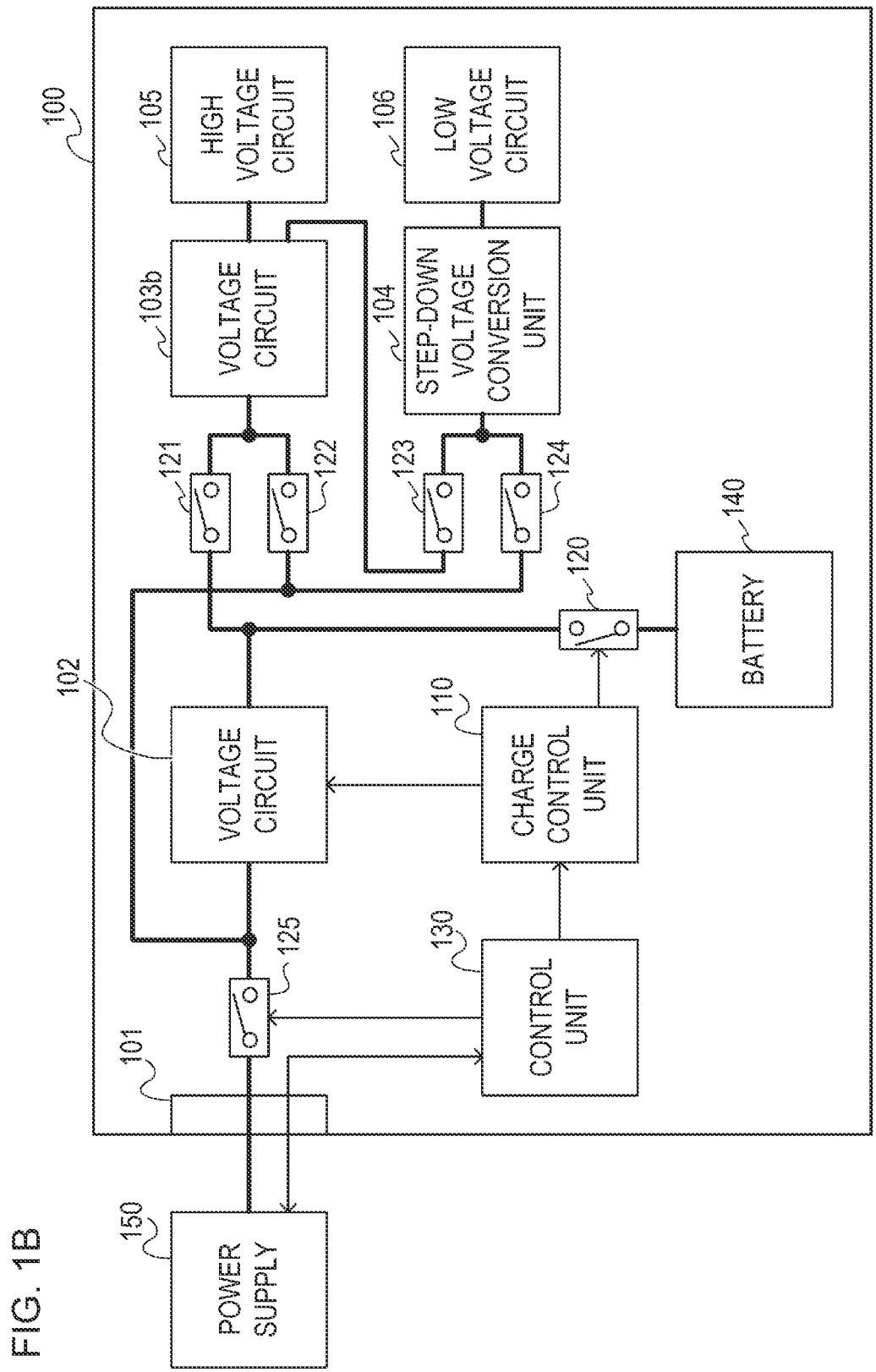

FIG. 1B is a diagram illustrating the electronic device 100 in which a voltage circuit 103b is used instead of the step-up voltage conversion unit 103a indicated in FIG. 1A.

The voltage circuit 103b not only generates power of a higher voltage, but also generates power of a low voltage. The voltage circuit 103b can increase the voltage of supplied power and output the power of the increased voltage to the high voltage circuit 105, and can decrease the voltage of supplied power and output the power of the decreased voltage to the step-down voltage conversion unit 104. If the voltage of power supplied from the battery 140 or the power supply 150 is decreased in two stages by the voltage circuit 103b and the step-down voltage conversion unit 104, then the efficiency of the power conversion (ratio of the output power to the input power) improves.

In a case where the high voltage circuit 105 and the low voltage circuit 106 are operated by the power supplied from either the battery 140 or the power supply 150, the efficiency of the power conversion in the electronic device 100 generally improves more with the configuration in FIG. 1B than with the configuration in FIG. 1A.

Generally the efficiency of power conversion has a tendency to drop if the difference between the input voltage and the output voltage is large. In recent years, most internal circuits of electronic devices (e.g. digital cameras) are low voltage circuits. The low voltage circuit 106 tends to require more power than the power required by the high voltage circuit 105. But the high voltage circuit 105 is a circuit necessary for the configuration. Therefore, the electronic device 100 is demanded to operate the low voltage circuit 106 at high efficiency while supplying power to the high voltage circuit 105 as well.

In the first embodiment, in a case where the battery 140 and the power supply 150 are available as the sources to supply power to the high voltage circuit 105 and to the low voltage circuit 106, and where predetermined conditions are satisfied, power supplied from the battery 140 is used for the high voltage circuit 105 which requires high voltage. If an 8.4V two-cell battery, which has high voltage power, is used for the battery 140, the step-up voltage conversion unit 103a and the voltage circuit 103b can efficiently generate the power to be outputted to the high voltage circuit 105.

On the other hand, power supplied from the power supply 150 is used to supply power to the low voltage circuit 106 which requires low voltage. The power supply 150 is a power supply conforming to the PPS of the USB PD standard, for example. Conforming to the PPS allows the power supply 150 to change the voltage of the power to be supplied to the electronic device 100 in the 3V to 20V range in 20 mV steps. Here if the control unit 130 requests the power supply 150 to supply power of which voltage is close to the voltage required by the low voltage circuit 106 (e.g. 3.0V), the voltage conversion efficiency of the voltage by the step-down voltage conversion unit 104 can be further improved.

In this case, an increase in power consumption due to the voltage conversion can be suppressed even if the electronic device 1X) is operating in an operation mode, of which power consumption is generally large (e.g. mode to record a high image quality moving image or a high frame rate moving image). Further, heating of the electronic device 100 can be controlled by suppressing the increase in power consumption due to voltage conversion. For example, in the case where the temperature of the electronic device 100 exceeds a predetermined temperature, heating of the electronic device 100 is controlled by stopping recording of the moving image (capturing moving image), then duration of recording the moving image by the electronic device 100 can be increased.

Figure 2A:
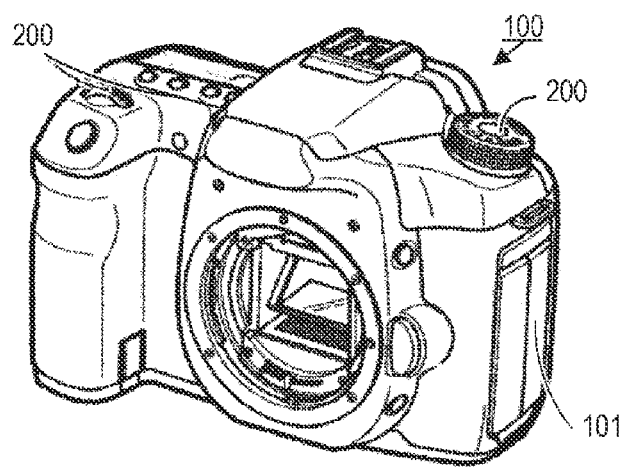
FIG. 2A and FIG. 2B are diagrams illustrating external views of the electronic device 100 according to the first embodiment.
Figure 2B:
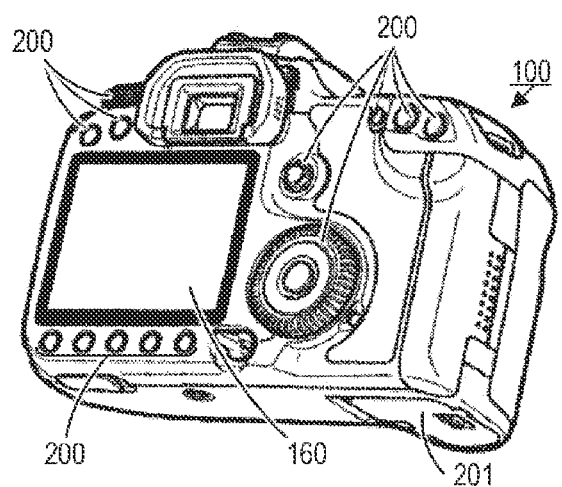

FIG. 2A and FIG. 2B are diagrams illustrating external views of the electronic device 100. These external views indicate that the electronic device 100 includes the connector 101, the LCD 160, operation units 200, and a battery cover 201.

The connector 101 is connected to the power supply 150. By the power supplied from the power supply 150 which is connected to the connector 101, the battery 140 can be charged, and the power supplying operation of the electronic device 100 can be performed.

The liquid crystal display (LCD) 160 is a display unit to display images. The LCD 160 is disposed on the rear face of the electronic device 100.

The operation units 200 receive operations by the user. Operations of the electronic device 100 are self-controlled in accordance with an operation received by the operation unit 200.

The battery cover 201 can be opened/closed. The battery cover 201 covers the battery 140 in the closed state. The control unit 130 can detect the open/close of the battery cover 201 depending on whether the physical switch that is in contact with the battery cover 201 is pressed or not. The control unit 130 can execute a process in accordance with the open/close state of the battery cover 201 (e.g. displaying message on the LCD 160 that the battery cover 201 is open).

Figure 3A:
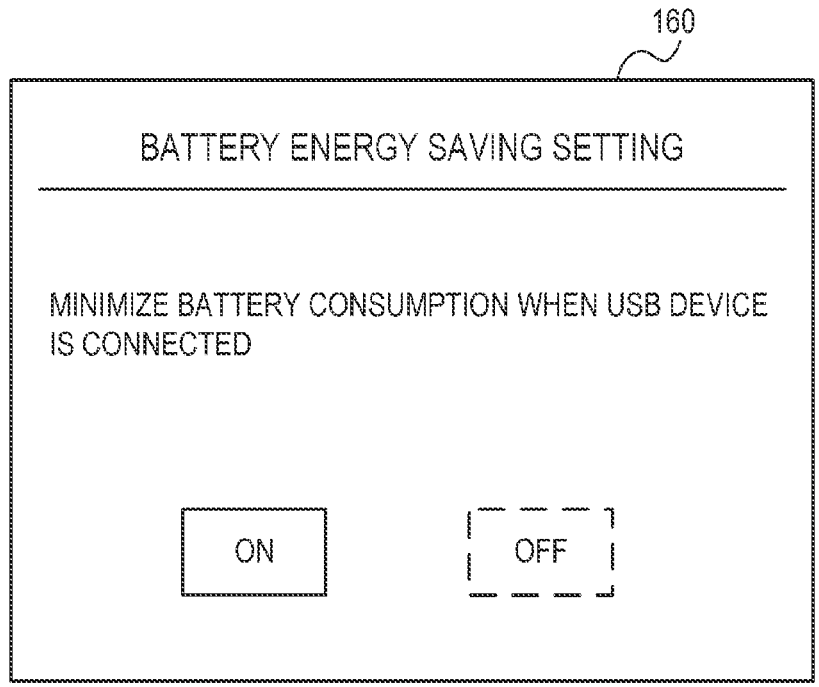
FIG. 3A to FIG. 3D are diagrams illustrating display examples of an LCD 160 according to the first embodiment.

FIG. 3A to FIG. 3D are diagrams for describing the display examples of the LCD 160. FIG. 3A is an example of a menu screen, and indicates a screen to set enable/disable of the "battery energy saving setting" to suppress power consumption of the battery 140. The enable/disable of the "battery energy saving setting" can be freely set by the user operating the operation unit 200.

The electronic device 100 according to the first embodiment can use the power supplied from the battery 140 for the high voltage circuit 105, even in the state of being connected to the power supply 150. If the high voltage power supplied from the battery 140 is used for the high voltage circuit 105 which requires high voltage power, heating of the electronic device 100 can be reduced. But in some cases, the user may reduce the power consumption of the battery 140 rather than extend the moving image recording time. In the first embodiment, when the user sets (enables) the "battery energy saving setting" in the menu screen indicated in FIG. 3A, the electronic device 100 uses the power of the power supply 150 with priority over the battery 140, for the high voltage circuit 105 and the low voltage circuit 106, if the power supply 150 is connected to the electronic device 100. Therefore, the power consumption of the battery 140 can be reduced.

Figure 3B:
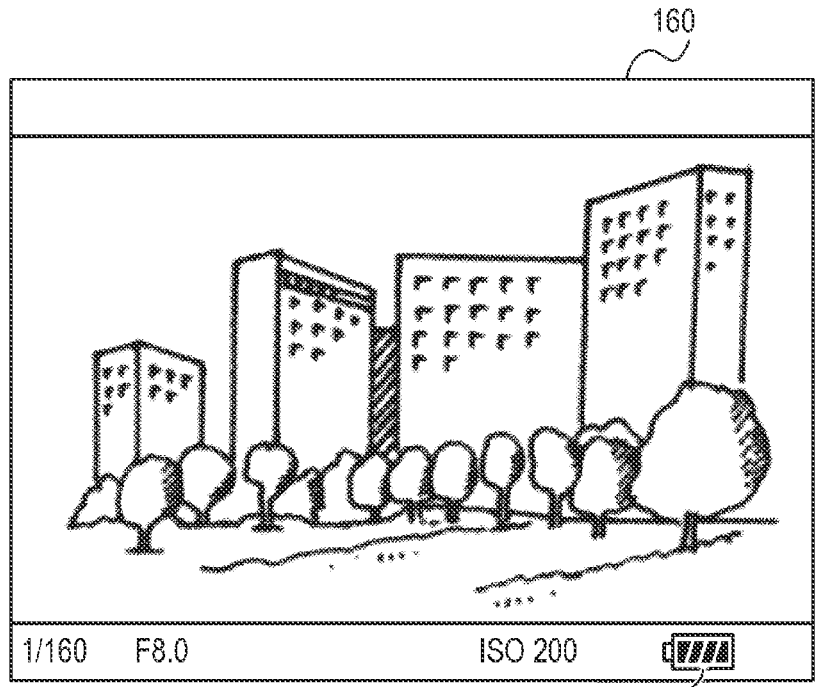
Figure 3C:
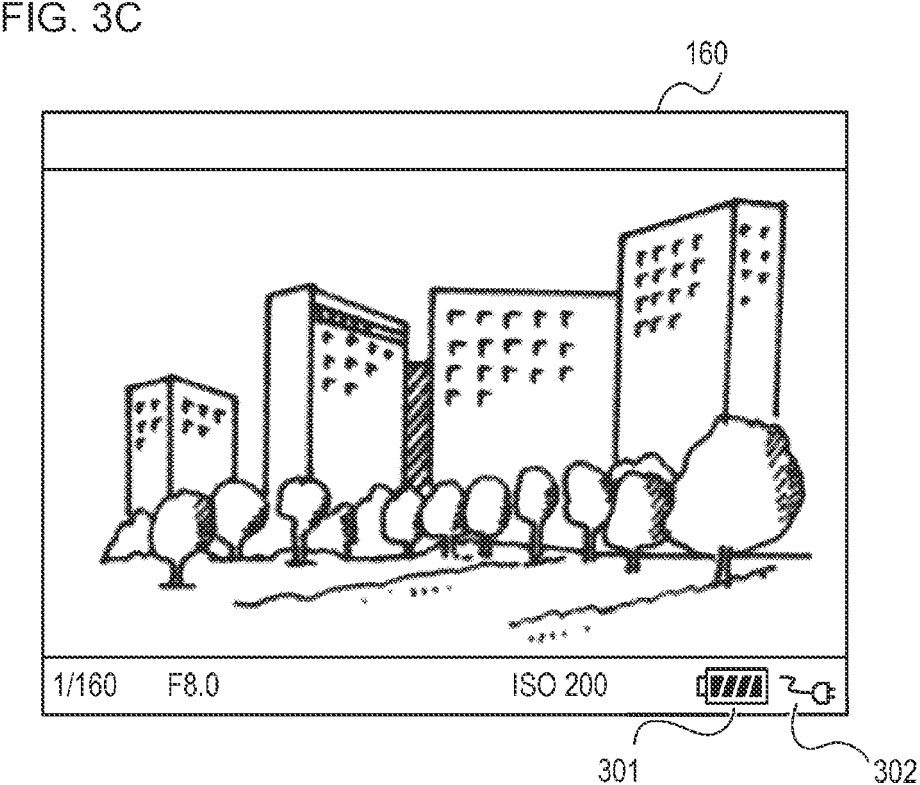
Figure 3D:
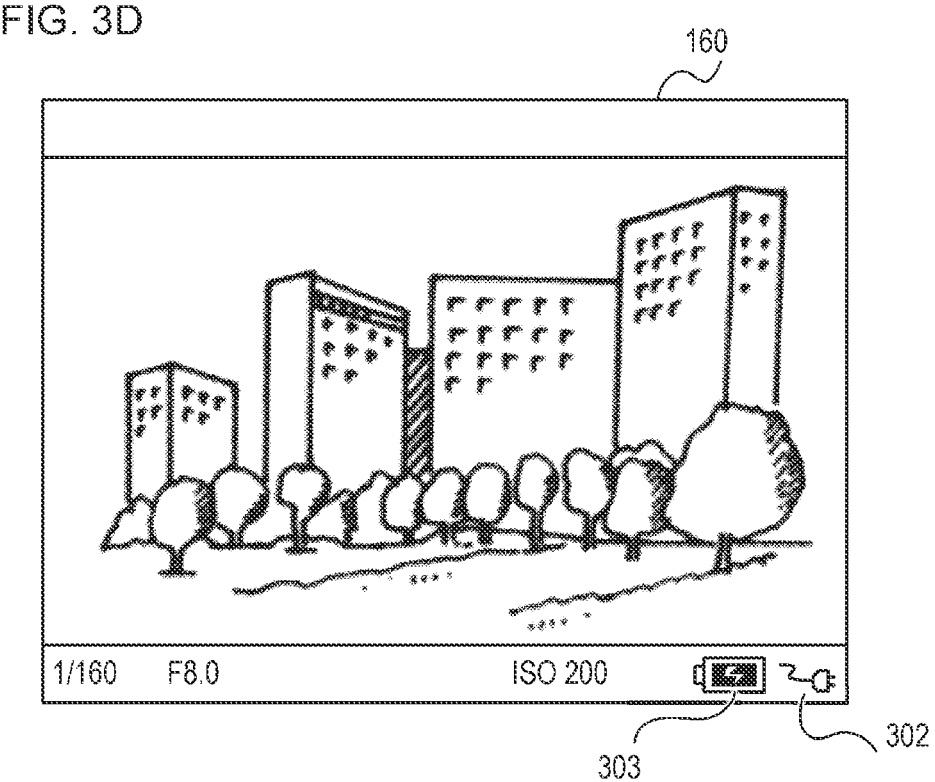

FIG. 3B to FIG. 3D are diagrams for describing the display examples of the LCD 160 indicating the supply source of the power that is in use by the electronic device 100. FIG. 3B indicates a display example of the LCD 160 in a case where the supply source of the power that is in use by the electronic device 100 is the battery 140. FIG. 3C indicates a display example of the LCD 160 in a case where the supply source of the power that is in use by the electronic device 100 is the battery 140 and the power supply 150. FIG. 3D indicates a display example of the LCD 160 in a case where the battery 140 is being charged using the power supply 150 as the supply source of the power.

A battery mark 301 is a display item to indicate that the electronic device 100 is using power supplied from the battery 140, and the residual amount of the battery 140 is indicated as a scale. A power supplying mark 302 is a display item to indicate that the electronic device 100 is using power supplied from the power supply 150. A charging mark 303 is a display item to indicate that the battery 140 is being charged by power supplied from the power supply 150.

By the abovementioned display (display items), the user can recognize whether power is supplied from the battery 140 or from the power supply 150. FIG. 3B to FIG. 3D are examples of the display, and any display, to indicate the supply source of the power that is in use by the electronic device 100, may be used as long as the user can recognize the power source.

Figure 4:
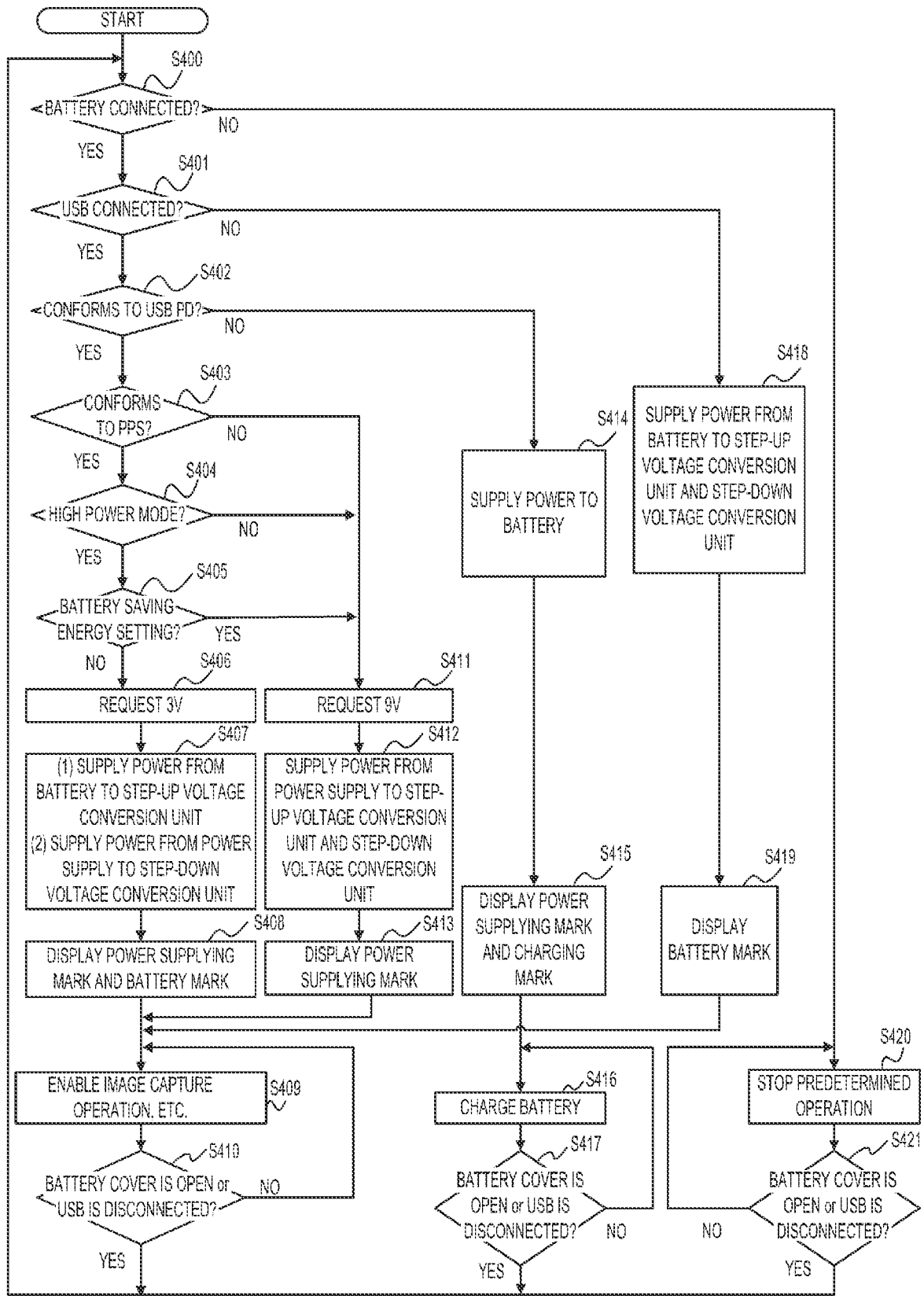
FIG. 4 is a flow chart illustrating a power control process according to the first embodiment.

A power control process (control method) of the electronic device 100 indicated in FIG. 1A will be described with reference to FIG. 4. FIG. 4 is a flow chart illustrating the power control process of the electronic device 100. The process of this flow chart is controlled by the control unit 130 executing programs. The electronic device 100 indicated in FIG. 1B may execute the process that is the same as this flow chart, where the process performed by the "step-up voltage conversion unit 103a" in this flow chart is performed by the "voltage circuit 103b".

In step S400, the control unit 130 determines whether the battery 140 is connected to the electronic device 100. If the battery 140 is connected to the electronic device 100, process advances to S401. If the battery 140 is not connected to the electronic device 100, on the other hand, process advances to step S420.

In step S401, the control unit 130 determines whether the power supply 150 is connected to the electronic device 100 via USB connection (connection using USB). If the power supply 150 is connected via USB, process advances to step S402. If the power supply 150 is not connected via USB, on the other hand, process advances to step S418.

In step S402, the control unit 130 determines whether the power supply 150 conforms to the USB PD standard. In the case where the power supply 150 conforms to the USB PD standard, power can be supplied from the power supply 150 to the electronic device 100 via cable. If the power supply 150 conforms to the USB PD standard, process advances to step S403. If the power supply 150 does not conform to the USB PD standard, on the other hand, process advances to step S414.

In step S403, the control unit 130 determines whether the power supply 150 conforms to the PPS of the USB PD standard. In the case where the power supply 150 conforms to the PPS of the USB PD standard, the control unit 130 can finely control the voltage of the power which the power supply 150 supplies to the electronic device 100. If the power supply 150 conforms to the PPS of the USB PD standard, process advances to step S404. If the power supply 150 does not conform to the PPS of the USB PD standard, on the other hand, process advances to step S411.

In step S404, the control unit 130 determines whether an operation mode of the electronic device 100 is an operation mode in which the power consumption is a predetermined value or more (high power mode). For example, in a moving image mode in which a moving image having a large data size is captured, as in the case of a high image quality moving image or a high frame rate moving image, the power consumption of the electronic device 100 is large and the heating is also large. In such a moving image mode, it is desired that the power consumption of the electronic device 100 is decreased, and the heating is suppressed. Here an example of the high power mode is the moving image mode, but the high power mode is not limited to this, and may be an arbitrary mode for which power consumption efficiency must be improved. If the operation mode of the electronic device 100 is the high power mode, process advances to step S405. If the operation mode of the electronic device 100 is not the high power mode, on the other hand, process advances to step S411.

In step S404, the control unit 130 determines whether the electronic device 100 is in the high power mode, but may determine whether the temperature of the electronic device 100 is a predetermined temperature or more. In this case, if the temperature of the electronic device 100 is the predetermined temperature or more, process advances to step S405. If the temperature of the electronic device 100 is less than the predetermined temperature, on the other hand, process advances to step S411.

In step S405, the control unit 130 determines whether the electronic device 100 is set to the "battery energy saving setting" (determines whether the "battery energy saving setting" is enabled). If the electronic device 100 is set to the "battery energy saving setting", process advances to step S411. If the electronic device 100 is not set to the "battery energy saving setting", on the other hand, process advances to step S406.

In the first embodiment, process advances to step S406 if the conditions are satisfied under which power supply 150 conforms to the PPS of the USB PD standard, the operation mode of the electronic device 100 is the high power mode, and the electronic device 100 is not set to the "battery energy saving setting". However the first embodiment is not limited to this, and process may advance to step S406 if any one or two of the conditions, (1) power supply 150 conforms to the PPS of the USB PD standard, (2) the operation mode is the high power mode, and (3) the electronic device 100 is not set to the "battery energy saving setting" are satisfied.

In steps S406, the control unit 130 performs PD communication with the power supply 150, and requests the power supply 150 to output power of voltage that is appropriate for the step-down voltage conversion unit 104 (e.g. 3V). In this description, the voltage appropriate for the step-down voltage conversion unit 104 is assumed to be 3V, but 3V is an example and the appropriate voltage is not limited to 3V.

In step S407, the control unit 130 implements control so that the power supplied from the battery 140 is supplied to the step-up voltage conversion unit 103a, and the power supplied from the power supply 150 is supplied to the step-down voltage conversion unit 104. Thereby the control unit 130 can control so that power of high voltage is supplied to the step-up voltage conversion unit 103a, and power of voltage that is lower than this voltage is supplied to the step-down voltage conversion unit 104. In step S407, the control unit 130 and the charge control unit 110 control the states of the voltage circuit 102 and the power switches 120 to 125. By this control, the path to supply power is determined. In step S407, the control unit 130 turns the voltage circuit 102 OFF, turns the power switches 120, 121, 124 and 125 ON, and turns the power switches 122 and 123 OFF.

Figure 5A:
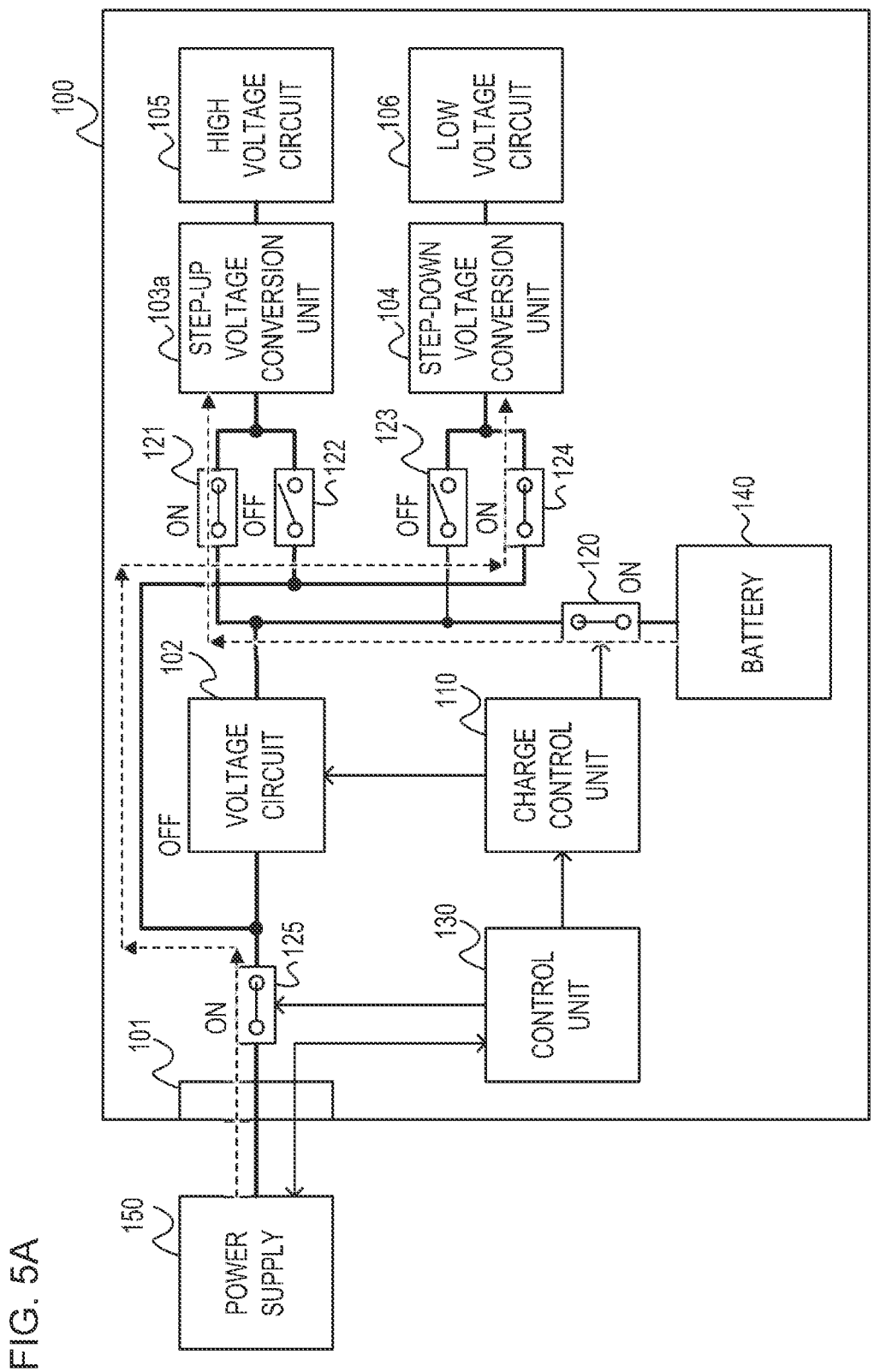
FIG. 5A and FIG. 5B are diagrams illustrating a flow of power according to the first embodiment.

FIG. 5A is a diagram for describing the states (ON state or OFF state) of the voltage circuit 102 and the power switches 120 to 125 after the process in step S407 completes. The power supplied from the battery 140 is supplied to the step-up voltage conversion unit 103a, and the power supplied from the power supply 150 is supplied to the step-down voltage conversion unit 104. Since the power of high voltage is supplied to the step-up voltage conversion unit 103a and the power of low voltage is supplied to the step-down voltage conversion unit 104, the voltage conversion efficiency in the electronic device 100 can be improved. As a result, the heating of the electronic device 100 can be suppressed even in the high power mode. By suppressing the heating of the electronic device 100, the moving image recording time can be further increased.

In step S408, the control unit 130 displays the power supplying mark 302 and the battery mark 301 on the LCD 160.

In step S409, the control unit 130 enables the image capture operation, the reproduction operation, or the like. Thereby the control unit 130 can cause the electronic device 100 to perform the image capture operation, the reproduction operation, or the like in accordance with instruction by the user. For example, the control unit 130 causes the electronic device 100 to capture a still image or a moving image, or reproduce a recorded still image or moving image in accordance with instruction by the user.

In step S410, the control unit 130 determines whether the battery cover 201 is open, and determines whether the USB (USB connection; connection via the USB) is disconnected. The control unit 130 can monitor the state of the battery cover 201 by an interrupt or by polling. For example, the control unit 130 detects whether the battery cover 201 is open or not depending on whether a physical switch, which is pressed by the battery cover 201 when the battery cover 201 is in the closed state, is pressed or not. If the battery cover 201 is open or if the USB is disconnected, process returns to step S400. If the battery cover 201 is closed and the USB is connected, process returns to step S409.

In step S411, the control unit 130 performs PD communication with the power supply 150, and requests the power supply 150 to output the power of voltage (e.g. 9V) which is appropriate for the electronic device 100 that requires both the high voltage power and the low voltage power. The voltage value appropriate for the electronic device 100 is 9V here, but is not limited to this voltage value.

The voltage of power for which the control unit 130 requests the power supply 150 in step S406 is lower than the voltage of the power for which the control unit 130 requests the power supply 150 in step S411. This is because the power of the power supply 150 is supplied to the step-down voltage conversion unit 104 and is not supplied to the step-up voltage conversion unit 103a in step S407 after step S406, hence the control unit 130 can request for a low voltage power appropriate for the step-down voltage conversion unit 104 without considering the step-up voltage conversion unit 103a. By the control unit 130 requesting the power supply 150 in step S406 to supply power of a lower voltage than in step S411, a large voltage difference is not generated between before and after conversion of voltage by the step-down voltage conversion unit 104.

In step S412, the control unit 130 implements control so that the power supplied from the power supply 150 is supplied to both the step-up voltage conversion unit 103*a* and the step-down voltage conversion unit 104. Here the control unit 130 turns the voltage circuit 102 OFF, turns the power switches 120, 121 and 123 OFF, and turns the power switches 122, 124 and 125 ON.

Figure 5B:
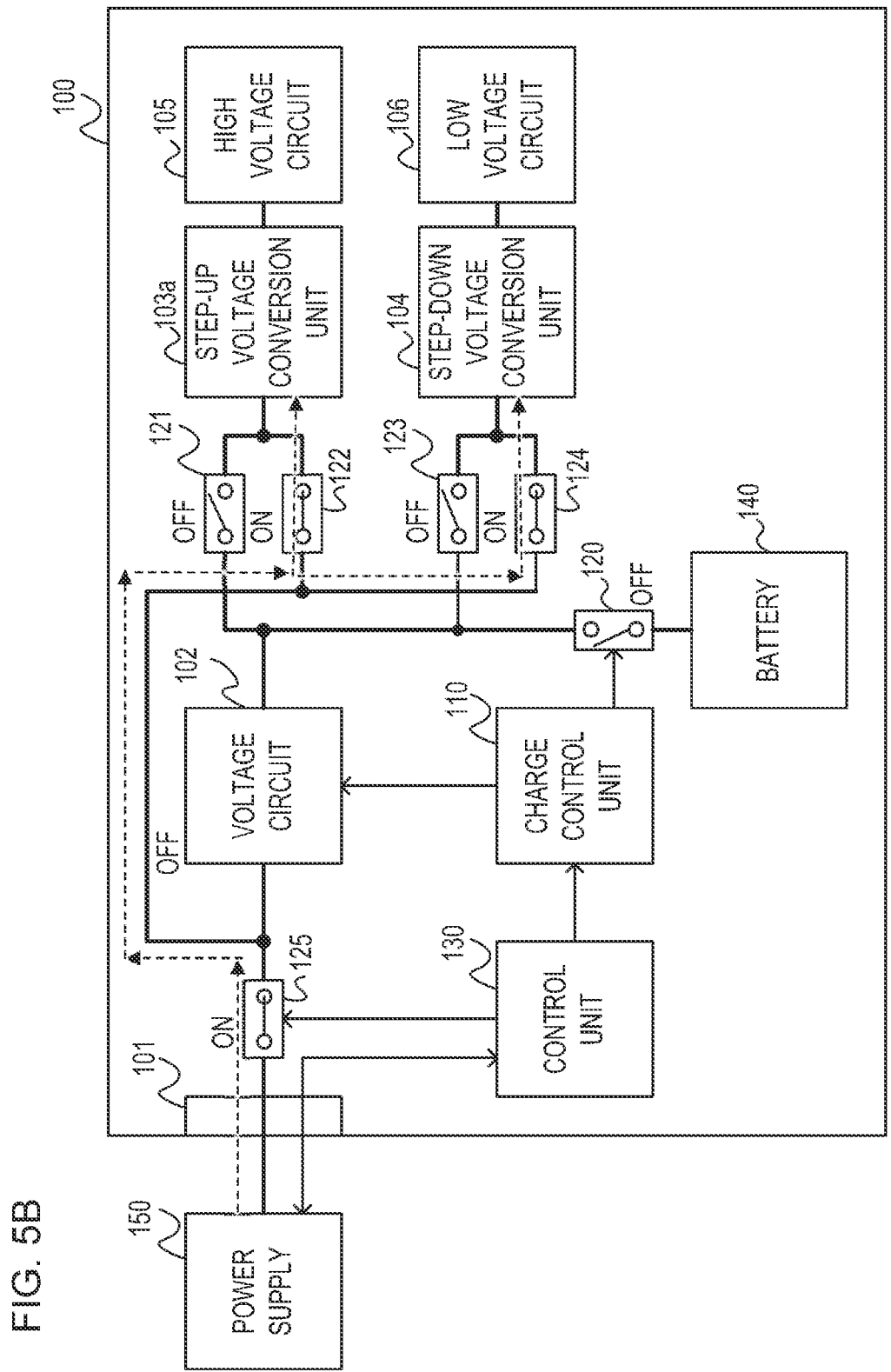

FIG. 5B indicates the states (ON state or OFF state) of the voltage circuit 102 and the power switches 120 to 125. The power supplied from the power supply 150 is supplied to both the step-up voltage conversion unit 103*a* and the step-down voltage conversion unit 104 via the power switch 125. Since the power of the battery 140 is not supplied to the high voltage circuit 105 and the low voltage circuit 106 in step S412, power consumption of the battery 140 can be suppressed.

In step S413, the control unit 130 displays the power supplying mark 302 on the LCD 160.

Figure 6A:
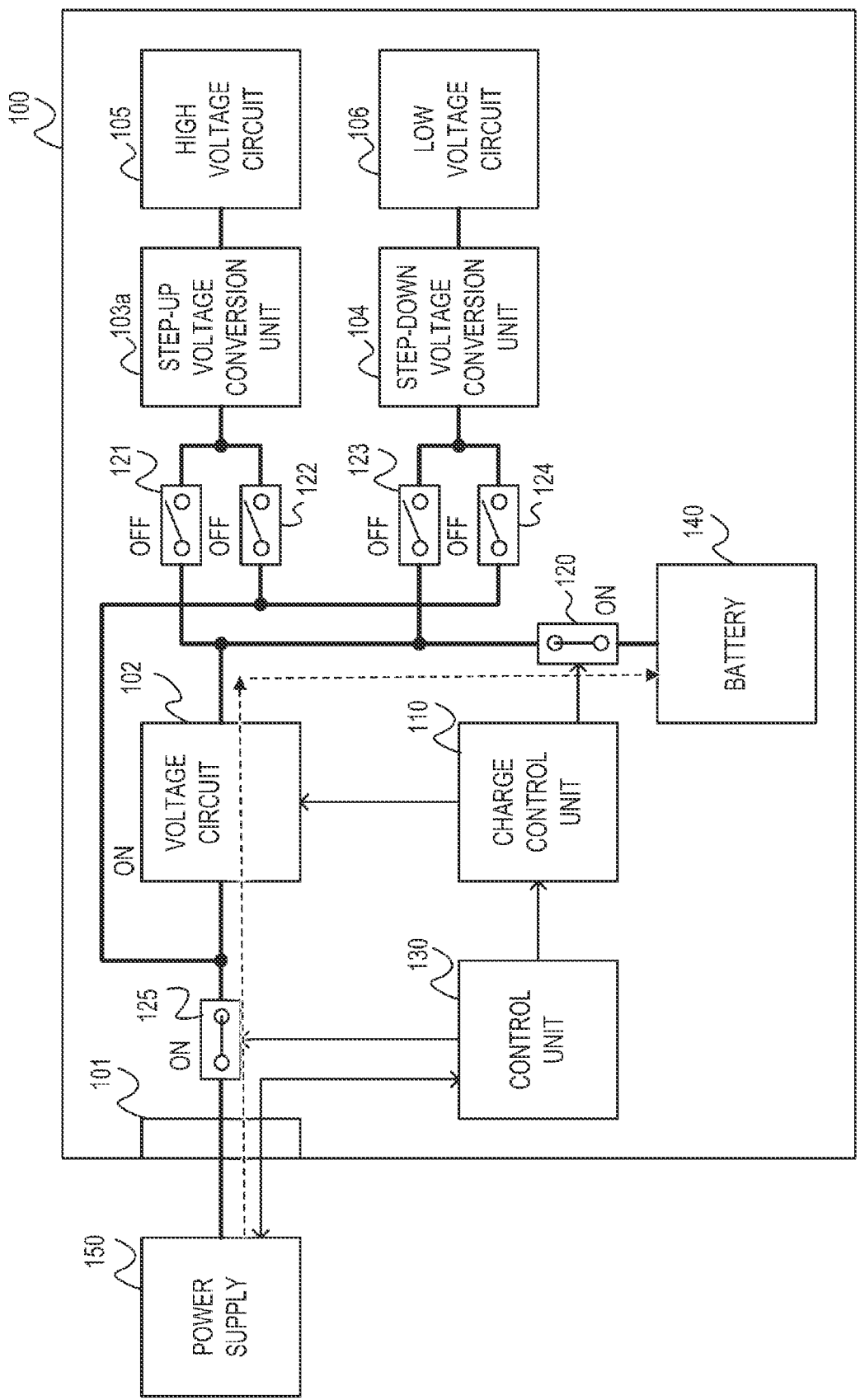
FIG. 6A and FIG. 6B are diagrams illustrating a flow of power according to the first embodiment.

In step S414, the control unit 130 supplies the power supplied from the power supply 150 to the battery 140. The control unit 130 turns the voltage circuit 102 ON, turns the power switches 120 and 125 ON, and turns the power switches 121, 122, 123 and 124 OFF. FIG. 6A indicates the states (ON state or OFF state) of the voltage circuit 102 and the power switches 120 to 125. In step S414, power supplying is not performed from the power supply 150 to the high voltage circuit 105 and the low voltage circuit 106, and power supplying from the power supply 150 to the battery 140 is performed.

In step S415, the control unit 130 displays the power supplying mark 302 and the charging mark 303 on the LCD 160. In step S414, the control unit 130 controls the flow of power so that power supplying from the power supply 150 to the battery 140 is performed without operating the high voltage circuit 105 and the low voltage circuit 106. However, the power to drive the LCD 160 (display member) is assumed to be supplied from the battery 140 via a power supply path.

In step S416, the control unit 130 charges the battery 140 using the power supplied from the power supply 150.

In step S417, the control unit 130 determines whether the battery cover 201 is open and whether the USB is disconnected, just like step S410. If the battery cover 201 is open or if the USB is disconnected, process returns to step S400. If the battery cover 201 is closed and the USB is connected, process returns to step S416.

In step S418, the control unit 130 implements control so that the power supplied from the battery 140 is supplied to the step-up voltage conversion unit 103*a* and the step-down voltage conversion unit 104. The control unit 130 turns the voltage circuit 102 OFF, turns the power switches 120, 121 and 123 ON, and turns the power switches 122, 124 and 125 OFF.

Figure 6B:
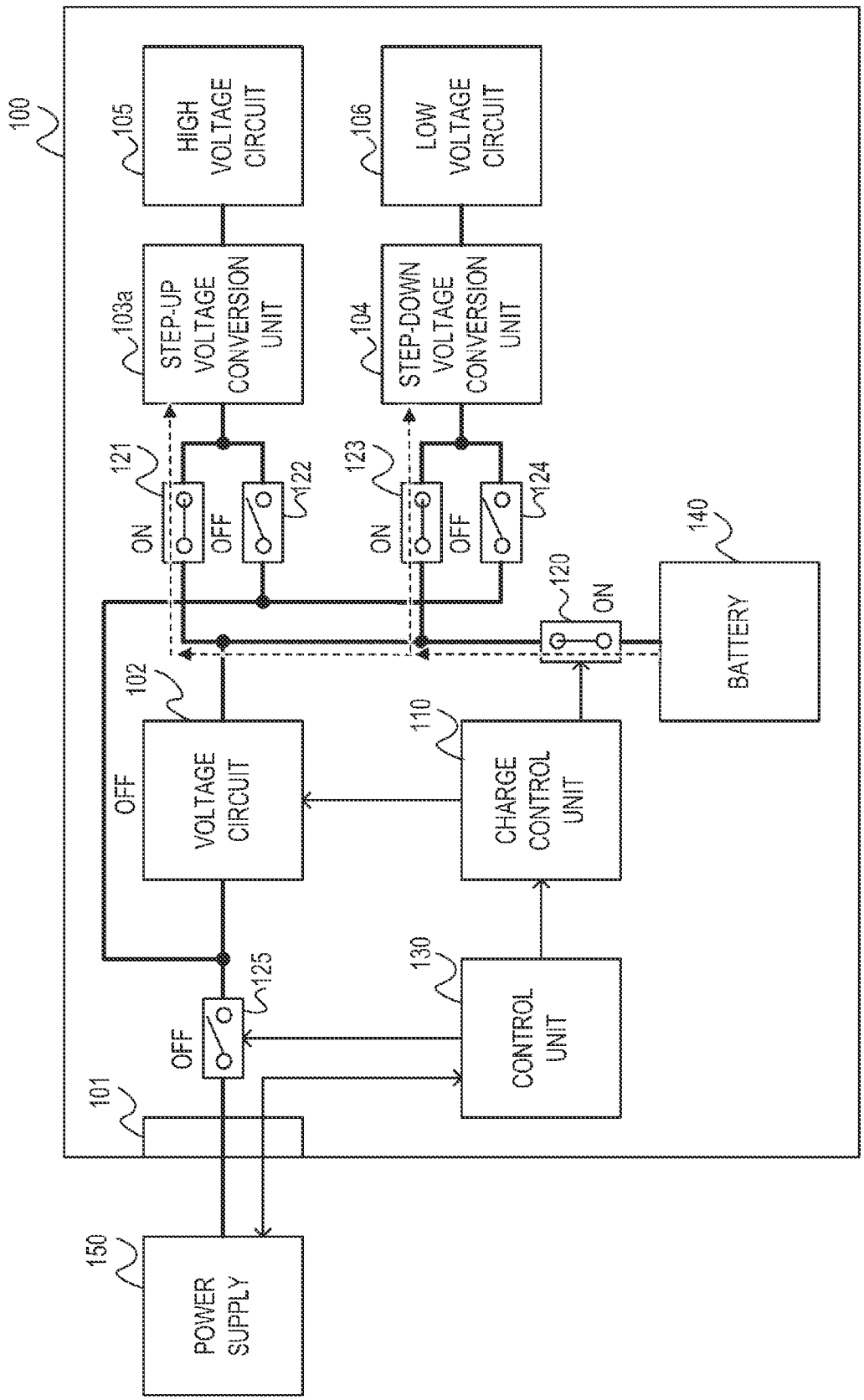

FIG. 6B indicates the states (ON state or OFF state) of the voltage circuit 102 and the power switches 120 to 125. The power supplied from the battery 140 is supplied to the step-up voltage conversion unit 103*a* and the step-down voltage conversion unit 104 via the power switches 120, 121 and 123. Therefore, the power supply 150 is not connected to the electronic device 100 via USB, and in the case where the battery 140 is connected to the electronic device 100, the electronic device 100 can operate using the power supplied from the battery 140.

In step S419, the control unit 130 displays the battery mark 301 on the LCD 160.

In step S420, the control unit 130 stops the predetermined operation. In the state in step S400, the battery 140 is not connected to the electronic device 100, hence the electronic device 100 receives power from the power supply 150. In this example, the electronic device 100 stops the predetermined operation in the state where the battery 140 is not connected to the electronic device 100, but the present invention is not limited to this. For example, if the electronic device 100 is connected to the power supply 150, the electronic device 100 may perform the power supplying operation using the power supplied from the power supply 150, even if the battery 140 is not connected to the electronic device 100.

In step S421, the control unit 130 determines whether the battery cover 201 is opened and whether the USB is disconnected, just like steps S410 and S417. If the battery cover 201 is open or if the USB is disconnected, process returns to step S400. If the battery cover 201 is closed and the USB is connected, process returns to step S420.

In the case where the predetermined condition is satisfied, the electronic device 100 supplies the high voltage power to the step-up voltage conversion unit 103*a*, and supplies the low voltage power to the step-down voltage conversion unit 104, herefore, according to the first embodiment, the width of converting the voltage can be decreased, and the electronic device 100, of which power conversion efficiency is improved, can be provided. Even in an operation mode in which power consumption is generally high, such as a moving image mode in which a high image quality or a high frame rate moving image recording (moving image capturing) is performed, an increase in power consumption of the electronic device 100 due to voltage conversion loss (power consumption generated by voltage conversion) can be suppressed. If heating of the electronic device 100 can be suppressed by controlling the voltage conversion loss, the moving image recording time of the electronic device 100 can be further increased, for example.

Figure 7:
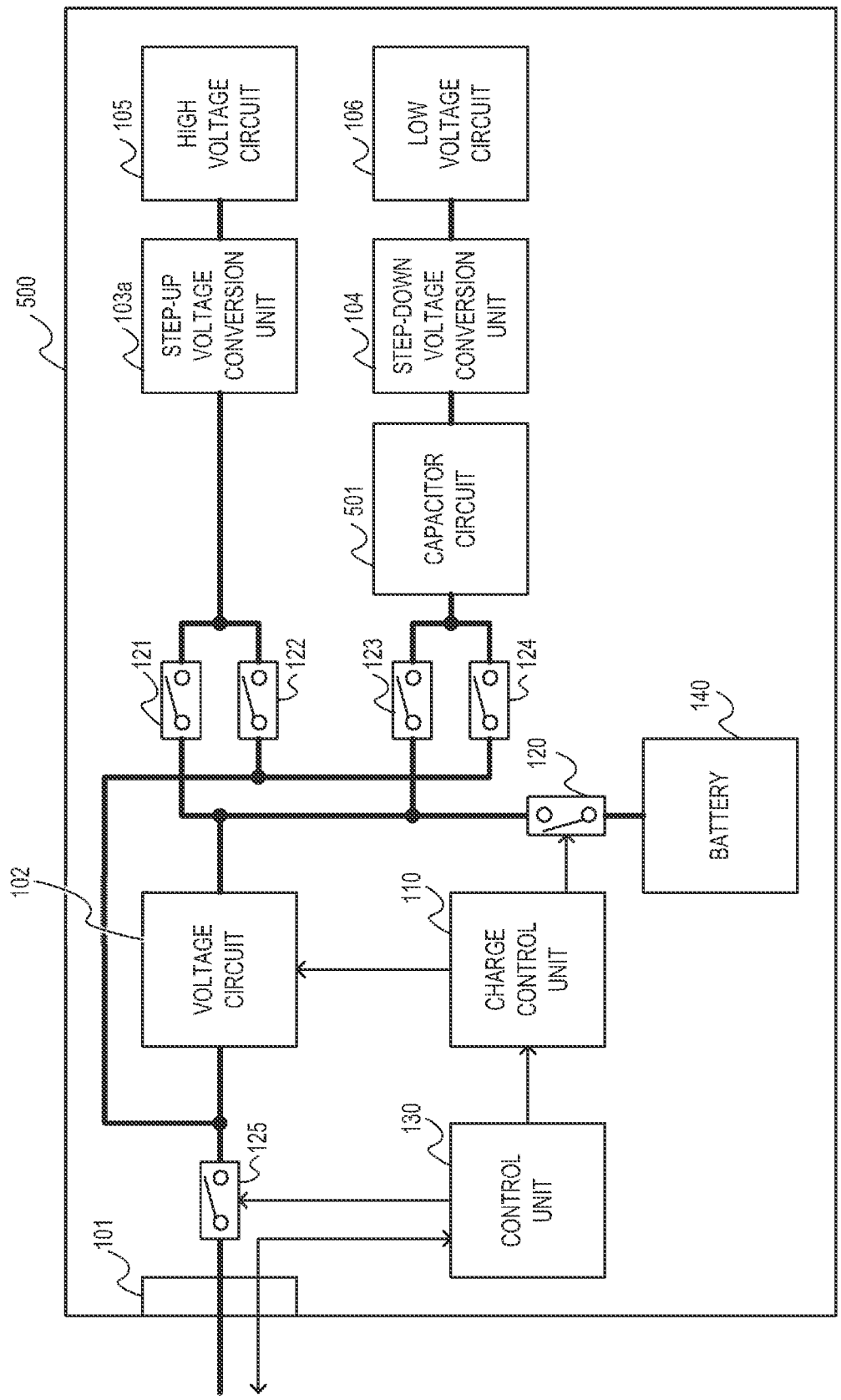
FIG. 7 is a diagram illustrating components of an electronic device 500 according to a second embodiment.

[Second Embodiment] An electronic device 500 according to a second embodiment will be described next with reference to FIG. 7 and FIG. 8. FIG. 7 is a diagram illustrating components of the electronic device 500 according to the second embodiment. In FIG. 7, each composing element denoted with the same reference sign as the first embodiment is the same, hence description thereof is omitted. The electronic device 500 includes a capacitor circuit 501 in addition to the components of the electronic device 100 according to the first embodiment. In the second embodiment as well, the voltage circuit 103*b* may be used instead of the step-up voltage conversion unit 103*a*, just like the first embodiment. In this case, the power of which voltage that is dropped by the voltage circuit 103*b* may be supplied to the capacitor circuit 501.

The capacitor circuit 501 is a circuit to convert (to drop) the voltage of the power supplied from the power supply 150 (input voltage) to a 1/(integer) of the voltage. The capacitor circuit 501 is a switched capacitor circuit (switched capacitor power supply circuit) which includes a capacitor element and a switch element. Generally, the switched capacitor circuit can convert voltage more efficiently compared with a switching regulating circuit (switching regulating power supply circuit). In the second embodiment, the capacitor circuit 501 can output the power of voltage that is ½ times or ⅓ times of the input voltage. In this case, the capacitor circuit 501 can output the power of current that is 2 times or 3 times of the input current.

In the USB standard, an amount of current that can be supplied is determined depending on the voltage. For example, according to the USB standard, the current is a maximum 5A when the voltage is 20V, and is a maximum 3A when the voltage is less than 20V. In terms of safety, it is better if the current that flows through the cable connecting the electronic device 500 and the power supply 150 is small. Therefore the control unit 130 requests the power supply 150 to output power of voltage that is an integral multiple of the voltage requested by the step-down voltage conversion unit 104, and the capacitor circuit 501 sets 1/(integer) of the voltage of the supplied power, so as to increase the current of the supplied power. Thereby the amount of current that flows through the cable and the connector 101 can be decreased.

FIG. 8 is a flow chart illustrating the power control process of the electronic device 500 according to the second embodiment. Description is omitted for steps in which the process similar to the first embodiment is performed. In the second embodiment, however, if the electronic device 100 is set to the "battery energy saving setting" in step S405, process advances to step S601, instead of to step S406. In the second embodiment, the control unit 130 advances the process to step S603 when the process in step S411 completes.

In step S601, the control unit 130 performs PD communication with the power supply 150, just like step S411, and requests the power supply 150 to output the power of voltage (e.g. 9V) which is appropriate for the electronic device 500 that requires both the high voltage power and the low voltage power.

In step S602, the control unit 130 sets the capacitor circuit 501 to output the power of which voltage is ⅓ times of the input voltage. Then the control unit 130 advances the process from step S602 to step S407.

In step S603, the control unit 130 sets the capacitor circuit 501 to output the power of which voltage is ⅓ times of the input voltage, just like step S602. Then the control unit 130 advances the process from step S603 to step S412.

Thereby a power of 3V is supplied to the step-down voltage conversion unit 104 in the same manner as the voltage requested in step S406 in the first embodiment. If 3A of current flows through the USB connector 101 at a 9V voltage, 9A of power can be supplied to the step-down voltage conversion unit 104 at 3V by the power conversion performed by the capacitor circuit 501. Then even if the low voltage circuit 106 requires high current (a large amount of power), power with high current can be supplied. In this description, the electronic device 500 requests 9V from the power supply 150, and the voltage is converted to ⅓ times of the voltage inside the electronic device 500, but this is an example, and the present invention is not limited to this.

In step S604, the control unit 130 sets the capacitor circuit 501 to output the power of which voltage is ½ times of the input voltage. In the second embodiment, the voltage range of the battery 140 is 6.0V to 8.4V, hence the voltage of the power that is supplied to the step-down voltage conversion unit 104 can be about 3.0V to 4.2V by setting the capacitor circuit 501 to output the voltage that is ½ times of the output voltage.

In the second embodiment as well, in the case where the predetermined conditions are satisfied, the high voltage power is supplied to the step-up voltage conversion unit 103a, and supplies the low voltage power to the step-down voltage conversion unit 104, similarly to the first embodiment. Therefore, according to the second embodiment, the width of converting the voltage can be decreased, and the electronic device 500, of which power conversion efficiency is improved, can be provided. Even in an operation mode in which power consumption is high (e.g. moving image mode in which a high image quality or a high frame rate moving image recording (moving image capturing) is performed), an increase in power consumption of the electronic device 500 due to voltage conversion loss can be suppressed. If heating of the electronic device 500 can be suppressed by controlling the voltage conversion loss, the moving image recording time of the electronic device 500 can be further increased, for example. Furthermore, using the capacitor circuit 501, the power of low voltage and high current can be supplied to the step-down voltage conversion unit 104. Therefore, a high current power can be supplied to the step-down voltage conversion unit 104 and the low voltage circuit 106, even if the maximum current amount between the power supply 150 and the electronic device 500 is limited. If the capacitor circuit 501 is used, the voltage that is supplied from the battery 140 to the step-down voltage conversion unit 104 can be decreased in advance, hence voltage conversion efficiency of the power can be improved.

[Third Embodiment] Various functions, processes, and methods that have been described in the above embodiments can also be implemented by a personal computer, a microcomputer, a CPU (Central Processing Unit), or the like by using a program. In a third embodiment, the personal computer, the microcomputer, the CPU, or the like is hereinafter referred to as a "computer X". In the third embodiment, a program for controlling the computer X and for implementing the various functions, processes, and methods described in the above embodiments is referred to as a "program Y".

The various functions, processes and methods described in the above embodiments are implemented through execution of the program Y by the computer X. In this case, the program Y is supplied to the computer X via a computer readable storage medium. The computer readable storage medium in the third embodiment includes at least one of a hard disk device, a magnetic storage device, an optical storage device, a magnetooptical storage device, a memory card, a volatile memory, a nonvolatile memory, or the like. The computer readable storage medium in the third embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all such modifications and equivalent structures.

This application claims the benefit of Japanese Patent Application No. 2020-162624, filed on Sep. 28, 2020, which is hereby incorporated by reference herein in its entirety.

What is claimed is:

1. An electronic device comprising:
   a central processing unit (CPU) that executes a program stored in a memory and causes the electronic device to function as:
   a first voltage conversion unit that generates a first voltage from power supplied from a first power supply or a second power supply;
   a second voltage conversion unit that generates a second voltage, which is lower than the first voltage, from power supplied from the first power supply or the second power supply; and
   a control unit that controls a process of supplying power, supplied from the first power supply, to the first voltage conversion unit and a process of supplying power, supplied from the second power supply, to the second voltage conversion unit, in a case where a predetermined condition is satisfied,
wherein the control unit performs a control so that power supplied from the second power supply is supplied to the first voltage conversion unit and the second voltage conversion unit, in a case where the second power supply conforms to USB power delivery (PD) standard and the predetermined condition is not satisfied.

2. The electronic device according to claim 1, wherein the control unit performs control so that a third voltage is supplied to the first voltage conversion unit and a fourth voltage, which is lower than the third voltage, is supplied to the second voltage conversion unit, in the case where the predetermined condition is satisfied.

3. The electronic device according to claim 1, wherein the predetermined condition includes a condition in which the second power supply conforms to programmable power supply (PPS) of USB PD standard.

4. The electronic device according to claim 1, wherein the electronic device has a high power mode that is an operation mode in which power consumption is a predetermined value or more, and
wherein the predetermined condition includes a condition in which the operation mode of the electronic device is the high power mode.

5. The electronic device according to claim 4, wherein the high power mode is a moving image capture mode in which power consumption is the predetermined value or more.

6. The electronic device according to claim 1, wherein the first power supply is a rechargeable battery,
wherein a predetermined setting to reduce power consumption of the battery is possible in the electronic device, and
wherein the predetermined condition includes a condition in which the predetermined setting is not performed.

7. The electronic device according to claim 1, wherein the control unit performs control so that power supplied from the first power supply is supplied to the first voltage conversion unit and the second voltage conversion unit, in a case where the second power supply is not connected to the electronic device via USB.

8. The electronic device according to claim 1, wherein the first power supply is a rechargeable battery, and
wherein the control unit performs power control so that power supplied from the second power supply is supplied to the battery, in a case where the second power supply is connected to the electronic device via USB and the second power supply does not conform to USB PD standard.

9. The electronic device according to claim 1, wherein the first voltage conversion unit can further generate a fifth voltage, which is lower than voltage supplied to the first voltage conversion unit, and
wherein the first voltage conversion unit generates the fifth voltage from power supplied to the first voltage conversion unit and outputs the fifth voltage to the second voltage conversion unit, in a case other than the case where the predetermined condition is satisfied.

10. The electronic device according to claim 1, further comprising a switched capacitor circuit which includes a capacitor element and a switch element, wherein the switched capacitor circuit lowers voltage of power supplied from the first power supply or the second power supply to the second voltage conversion unit.

11. The electronic device according to claim 1, further comprising a display,
wherein the control unit performs a control so that the display unit displays a display item indicating that the electronic device is using power supplied from the first power supply, and a display item indicating that the electronic device is using power supplied from the second power supply, in the case where the predetermined condition is satisfied.

12. The electronic device according to claim 1, further comprising:
a first load circuit that requires power of the first voltage or more; and
a second load circuit that requires power of the second voltage or more,
wherein the first voltage from the first conversion unit is supplied to the first load circuit and the second voltage from the second conversion unit is supplied to the second load circuit.

13. The electronic device according to claim 12,
wherein the first load circuit includes at least one of a motor circuit to drive a shutter of the electronic device, a motor circuit to drive a lens, and a backlight of a liquid crystal display, and wherein the second load circuit includes an imaging sensor.

14. The electronic device according to claim 1, wherein the CPU further causes the electronic device to function as:
a first switch unit that 1) receives the power supplied from the first power supply and the power supplied from the second power supply and 2) outputs one of the power supplied from the first power supply and the power supplied from the second power supply to the first voltage conversion unit;
a second switch unit that 1) receives the power supplied from the first power supply and the power supplied from the second power supply and 2) outputs one of the power supplied from the first power supply and the power supplied from the second power supply to the second voltage conversion unit,
wherein the control unit controls the first switch unit and the second switch unit so that the power supplied from the first power supply is output to the first voltage conversion unit and the power supplied from the second power supply is output to the second voltage conversion unit in a case where the predetermined condition is satisfied.

15. The electronic device according to claim 1, wherein the first power supply is connected to the electronic device via a cable.

16. A method comprising:
causing a first voltage conversion unit to generate a first voltage from power supplied from a first power supply or a second power supply;
causing a second voltage conversion unit to generate a second voltage, which is lower than the first voltage, from power supplied from the first power supply or the second power supply;
controlling a process of supplying power, supplied from the first power supply, to the first voltage conversion unit and a process of supplying power, supplied from the second power supply, to the second voltage conversion unit, in a case where a predetermined condition is satisfied; and
performing a control so that power supplied from the second power supply is supplied to the first voltage conversion unit and the second voltage conversion unit, in a case where the second power supply conforms to USB power delivery (PD) standard and the predetermined condition is not satisfied.

17. A non-transitory storage medium that stores a program causing a computer to execute a method, the method comprising:
- causing a first voltage conversion unit to generate a first voltage from power supplied from a first power supply or a second power supply;
- causing a second voltage conversion unit to generate a second voltage, which is lower than the first voltage, from power supplied from the first power supply or the second power supply;
- controlling a process of supplying power, supplied from the first power supply, to the first voltage conversion unit and a process of supplying power, supplied from the second power supply, to the second voltage conversion unit, in a case where a predetermined condition is satisfied; and
- performing a control so that power supplied from the second power supply is supplied to the first voltage conversion unit and the second voltage conversion unit, in a case where the second power supply conforms to USB power delivery (PD) standard and the predetermined condition is not satisfied.

* * * * *